United States Patent
Mochizuki

(10) Patent No.: US 11,055,033 B2
(45) Date of Patent: Jul. 6, 2021

(54) INFORMATION PROCESSING APPARATUS, IMAGE FORMING APPARATUS, AND NON-TRANSITORY COMPUTER READABLE MEDIUM FOR INHIBITING TRANSMISSION OF SPECIFIC COMBINATIONS OF PRIVATE INFORMATION

(71) Applicant: FUJIFILM BUSINESS INNOVATION CORP., Tokyo (JP)

(72) Inventor: Akiko Mochizuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 426 days.

(21) Appl. No.: 15/914,601

(22) Filed: Mar. 7, 2018

(65) Prior Publication Data

US 2019/0087136 A1    Mar. 21, 2019

(30) Foreign Application Priority Data

Sep. 21, 2017    (JP) .............................. JP2017-181026

(51) Int. Cl.
  *G06F 3/12*    (2006.01)
  *G06Q 50/10*    (2012.01)
(52) U.S. Cl.
  CPC .......... *G06F 3/1206* (2013.01); *G06F 3/1222* (2013.01); *G06F 3/1238* (2013.01); *G06F 3/1285* (2013.01); *G06F 3/1295* (2013.01); *G06Q 50/10* (2013.01)

(58) Field of Classification Search
  CPC .................................................... G06F 3/1206
  USPC ........................................................ 358/1.13
  See application file for complete search history.

(56) References Cited

U.S. PATENT DOCUMENTS

| | | | |
|---|---|---|---|
| 2013/0010317 A1* | 1/2013 | Sai | G06F 3/1229 |
| | | | 358/1.13 |
| 2016/0277638 A1 | 9/2016 | Mochizuki | |
| 2017/0262236 A1* | 9/2017 | Sarin | G06F 3/1276 |
| 2018/0270395 A1* | 9/2018 | Yamamoto | H04N 1/603 |

FOREIGN PATENT DOCUMENTS

| | | |
|---|---|---|
| JP | 2016-129016 A | 7/2016 |
| JP | 2016-177672 A | 10/2016 |

* cited by examiner

*Primary Examiner* — Jacky X Zheng
(74) *Attorney, Agent, or Firm* — Oliff PLC

(57) ABSTRACT

An information processing apparatus includes a receiving unit and a controller. The receiving unit receives a selection of information which is to be output. The selection is selected from multiple types of information included in data obtained over a network and is based on each type. The controller exerts control in such a manner that, when the selected information includes multiple types of information constituting a predetermined particular combination, the selected pieces of information are not output.

16 Claims, 15 Drawing Sheets

FIG. 5

TARO FUJI             123456789XXX

MUNICIPAL TAX RECORDS

APRIL 2017         42,180 YEN
   MAY 2017           43,590 YEN
   JUNE 2017          46,840 YEN

FIG. 8

Select a button for information to be transmitted.

Name: Taro Fuji

Birth date: 12 June, XXXX

Social security and tax number: 123456789XXX

Municipal tax records
April 2017    42,180 yen
May 2017     43,590 yen
June 2017    46,840 yen Medical payment records
April 2017    2,880 yen
May 2017     3,500 yen
June 2017      640 yen Cancel Transmit

FIG. 13

| SOCIAL SECURITY AND TAX NUMBER | NAME INFORMATION | ADDRESS INFORMATION | BIRTH DATE | MUNICIPAL TAX INFORMATION | MEDICAL PAYMENT INFORMATION | PENSION INFORMATION |
|---|---|---|---|---|---|---|
| ○ | ○ | | | | | |
| ○ | | ○ | | | | |
| ○ | | | ○ | | | |
| ○ | | | | ○ | | |
| | | | | | | |
| | ○ | ○ | | | | |
| | ○ | | ○ | | | |

FIG. 15

| TRANSMISSION TIME | TRANSMISSION DESTINATION | TRANSMITTED INFORMATION | INDIVIDUAL NUMBER |
|---|---|---|---|
| 2017/07/12 12:13 | 116.58.11.1 | NAME INFORMATION | 1000123 |
| 2017/07/11 11:03 | 116.58.43.2 | SOCIAL SECURITY AND TAX NUMBER | 1000456 |
| 2017/07/11 09:55 | 222.11.33.108 | BIRTH DATE | 1002451 |
| 2017/07/11 09:34 | 116.58.11.1 | MUNICIPAL TAX INFORMATION | 1001114 |
| 2017/07/11 08:43 | 116.58.11.6 | NAME INFORMATION | 1003125 |
| 2017/07/11 08:26 | 116.58.11.8 | MEDICAL PAYMENT INFORMATION | 1000123 |

INFORMATION PROCESSING APPARATUS, IMAGE FORMING APPARATUS, AND NON-TRANSITORY COMPUTER READABLE MEDIUM FOR INHIBITING TRANSMISSION OF SPECIFIC COMBINATIONS OF PRIVATE INFORMATION

CROSS-REFERENCE TO RELATED APPLICATIONS

This application is based on and claims priority under 35 USC 119 from Japanese Patent Application No. 2017-181026 filed Sep. 21, 2017.

BACKGROUND

The present invention relates to an information processing apparatus, an image forming apparatus, and a non-transitory computer readable medium.

SUMMARY

According to an aspect of the invention, there is provided an information processing apparatus including a receiving unit and a controller. The receiving unit receives a selection of information which is to be output. The selection is selected from multiple types of information included in data obtained over a network and is based on each type. The controller exerts control in such a manner that, when the selected information includes multiple types of information constituting a predetermined particular combination, the selected pieces of information are not output.

BRIEF DESCRIPTION OF THE DRAWINGS

Exemplary embodiments of the present invention will be described in detail based on the following figures, wherein:

FIG. 5 is a diagram illustrating exemplary municipal tax information obtained from a server apparatus in a city office;

FIG. 8 is an enlarged view of the display screen of the operation panel illustrated in FIG. 7;

FIG. 13 is a diagram illustrating exemplary information combinations which are inhibited from being transmitted;

FIG. 15 is a diagram illustrating exemplary transmission history information stored in a data storage unit.

DETAILED DESCRIPTION

Figure 1:
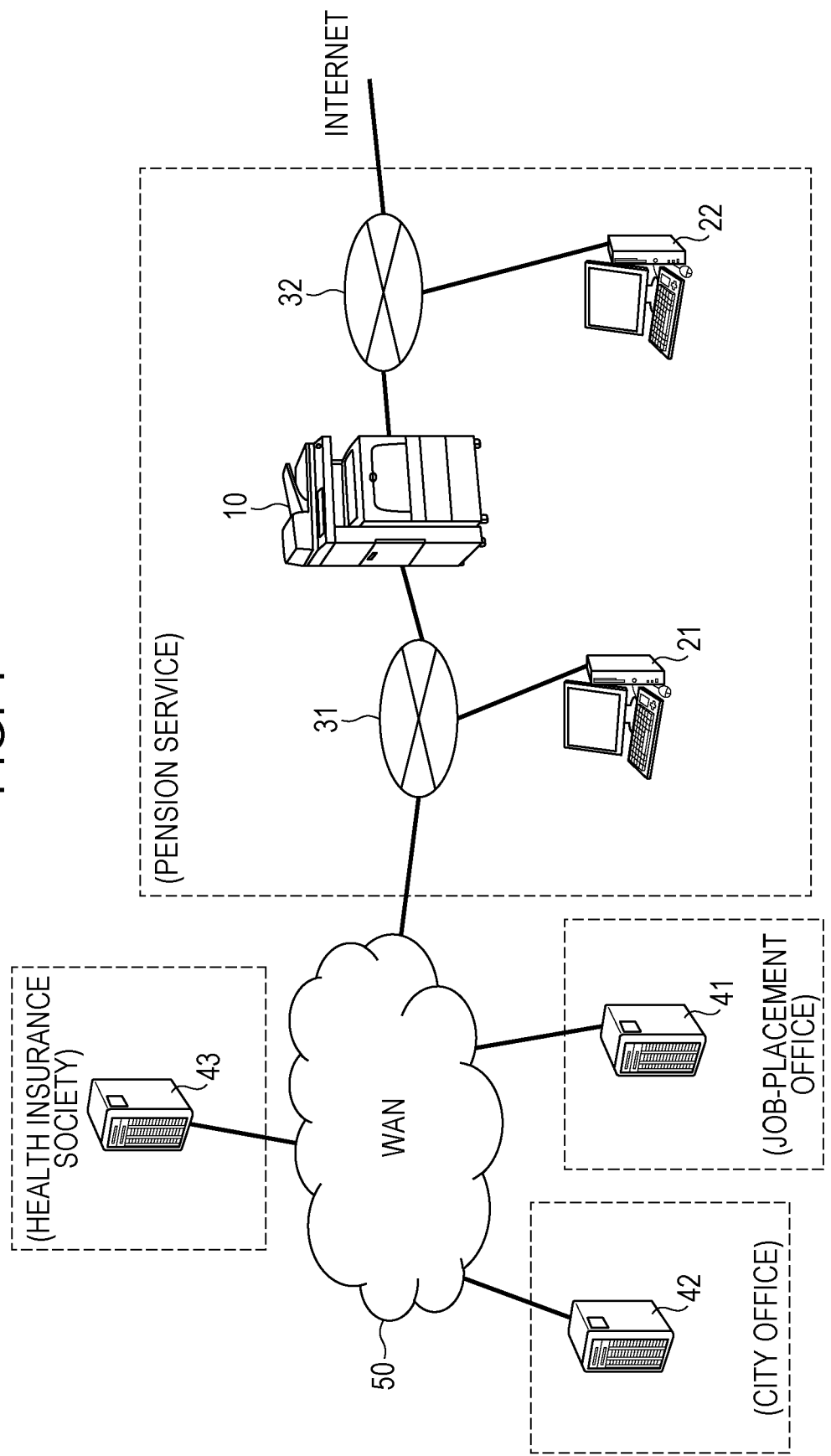
FIG. 1 is a diagram illustrating the configuration of an information processing system including an image forming apparatus according to an exemplary embodiment of the present invention.

Exemplary embodiments of the present invention will be described in detail by referring to the drawings.

FIG. 1 is a diagram illustrating the configuration of an information processing system including an image forming apparatus 10 according to an exemplary embodiment of the present invention.

The image forming apparatus 10 according to the exemplary embodiment is installed, for example, in a pension service, and is provided with a function which enables connection with both networks 31 and 32.

The image forming apparatus 10 is a so-called multifunction device having multiple functions, such as a print function, a scan function, a copy function, and a facsimile function.

In various public institutions, such as a pension service, a local government, a city office, and a health insurance society, a large amount of private information is handled in their tasks. Information included in private information includes basic information, such as name (first name and last name) information, birth date information, address information, and social security and tax numbers, and various information, such as tax payment information, pension information, and medical payment information.

For many of the types of private information, if multiple types of private information which may be specified as a person's private information are leaked, this causes a bigger problem than the case where a single type of private information is leaked. For example, if the tax payment information and information indicating whom the tax payment information is for are leaked, this causes a bigger problem than the case where only tax payment information is leaked.

Therefore, it is a fundamental principle that various types of private information are stored separately, for example, only in corresponding institutions managing the information, and that the management is not unified.

However, tasks in the public institutions may involve acquisition of multiple pieces of private information, used in execution of the tasks, from other public institutions. In this case, a risk of leakage of a set of multiple pieces of private information to the outside is incurred.

In the exemplary embodiment, a case in which, in a pension service which is one of the public institutions, private information is obtained from other public institutions, such as a city office and a health insurance society, to perform a task will be described.

For example, in the pension service illustrated in FIG. 1, in order to avoid leakage of private information, the network 32 which may be connected to external networks such as the Internet and the closed network 31 which is not connected to external open networks such as the Internet are provided.

The network 31 is connected to a network for external public institutions over a wide area network (WAN) 50. FIG. 1 illustrates the state in which the network 31 is connected to a server apparatus 41 in a job-placement office and a server apparatus 42 in a city office, and a server apparatus 43 in a health insurance society.

As an exemplary WAN 50, a network called a local government wide area network (LGWAN) may be used. The LGWAN is a network, dedicated to administration for public service, which connects local public bodies to each other. The LGWAN enables reception/transmission of information from/to a national institution through interconnection to a governmental common network which is a network for ministries.

The network 31 connected to databases of external public institutions over the WAN 50 is used to obtain necessary information. For example, a user operates a terminal apparatus 21 connected to the network 31, so as to obtain, from the server apparatuses 41 to 43, necessary information for a task. For example, a user operates the terminal apparatus 21 so as to obtain municipal tax information (local tax information) from the server apparatus 42 in the city office or obtain medical payment information from the server apparatus 43 in the health insurance society.

The network 32 is used as an internal task network. A user operates a terminal apparatus 22 so as to use the network 32 when various tasks and processes are performed.

The image forming apparatus 10 is connected to both the network 31 and the network 32. Therefore, when information obtained from an external public institution over the network 31 is to be used to generate secondary data for execution of a certain task, a user transfers, through the image forming apparatus 10, the obtained information to the terminal apparatus 22 which is used to perform tasks and which is connected to the network 32.

Figure 2:
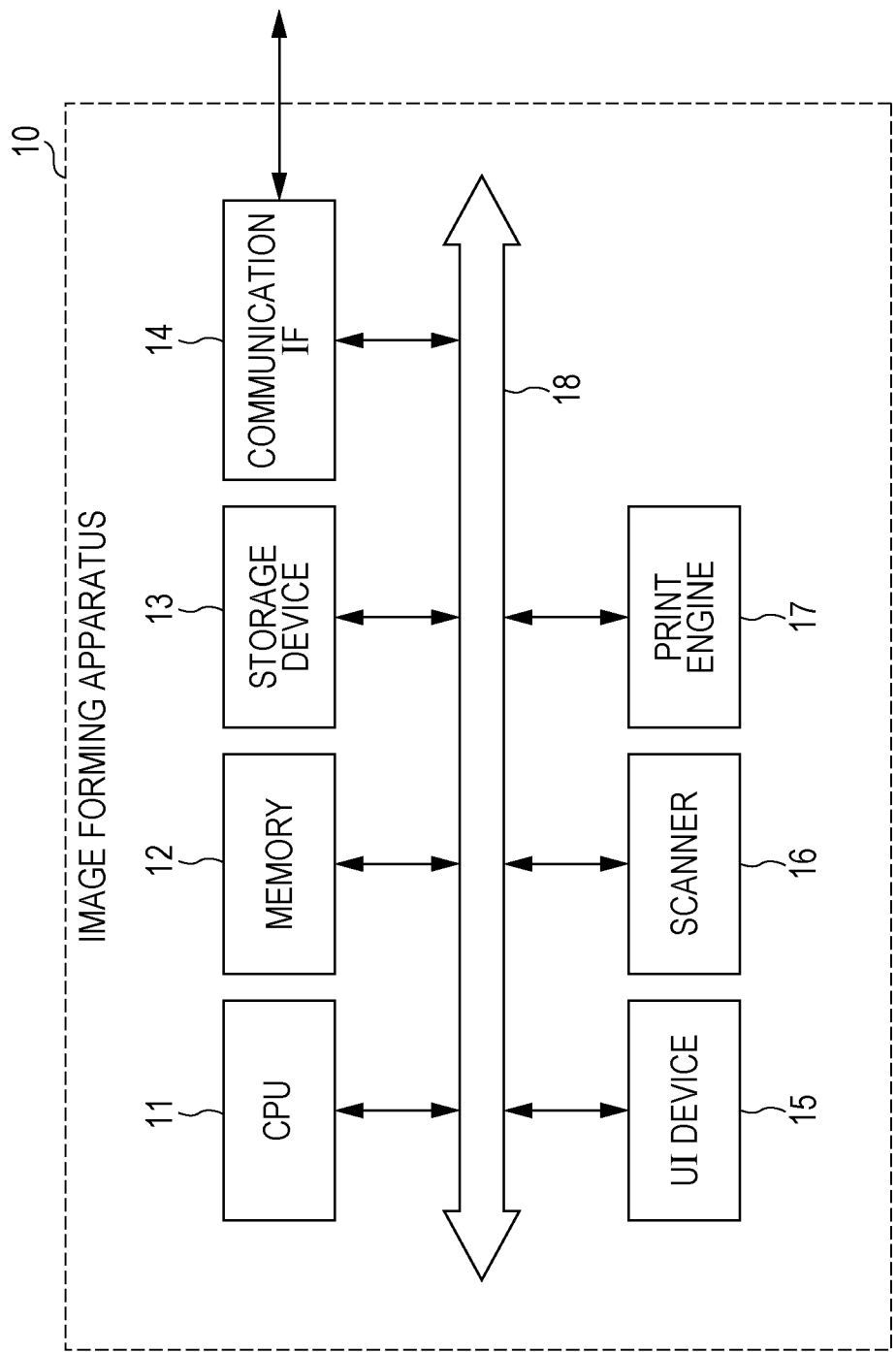
FIG. 2 is a block diagram illustrating the hardware configuration of the image forming apparatus according to the exemplary embodiment of the present invention.

FIG. 2 illustrates the hardware configuration of the image forming apparatus 10 in the information processing system according to the exemplary embodiment.

As illustrated in FIG. 2, the image forming apparatus 10 includes a central processing unit (CPU) 11, a memory 12, a storage device 13 such as a hard disk drive (HDD), a communication interface (IF) 14 receiving/transmitting data from/to external apparatuses or the like over the networks 31 and 32, a user interface (UI) device 15 including a touch panel or a liquid crystal display and a keyboard, a scanner 16, and a print engine 17. These components are connected to one another through a control bus 18.

The print engine 17 prints an image on a recording medium such as a print sheet after processes, such as charging, exposure, developing, transfer, and fixing.

The CPU 11 performs given processes on the basis of control programs stored in the memory 12 or the storage device 13, and controls operations of the image forming apparatus 10. In the exemplary embodiment, the description is made under the assumption that the CPU 11 reads and executes control programs stored in the memory 12 or the storage device 13. Alternatively, the programs may be stored in a storage medium such as a compact disc-read-only memory (CD-ROM), and may be provided to the CPU 11.

Figure 3:
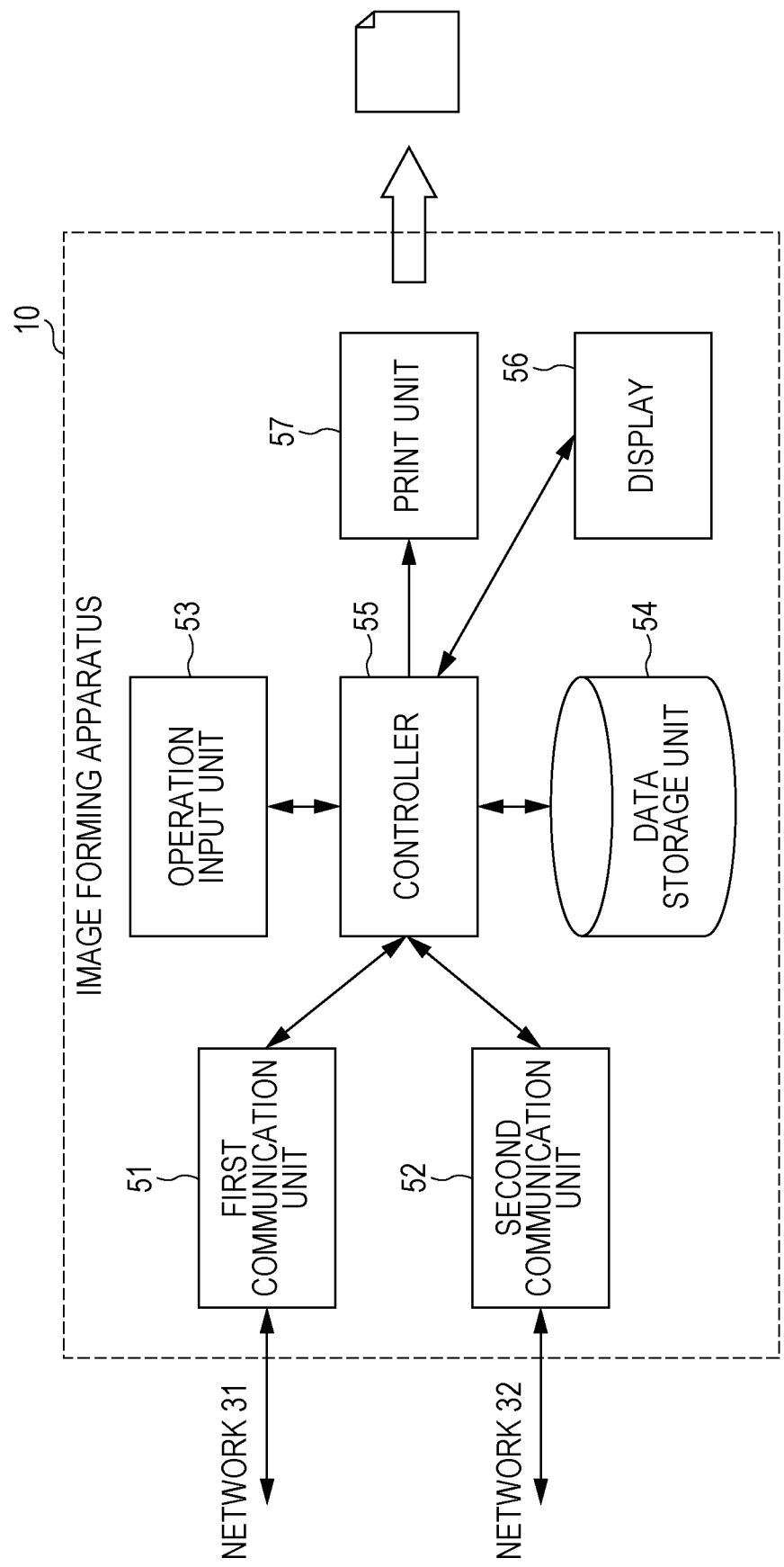
FIG. 3 is a block diagram illustrating the functional configuration of the image forming apparatus according to the exemplary embodiment of the present invention.

FIG. 3 is a block diagram illustrating the functional configuration of the image forming apparatus 10 which is implemented by executing the control programs.

As illustrated in FIG. 3, the image forming apparatus 10 according to the exemplary embodiment includes a first communication unit 51, a second communication unit 52, an operation input unit 53, a data storage unit 54, a controller 55, a display 56, and a print unit 57.

The first communication unit 51 connected to the network 31 performs communication with the server apparatuses 41 to 43, for example, in the job-placement office, the city office, and the health insurance society over the network 31 and the WAN 50.

The second communication unit 52 connected to the network 32 performs communication, for example, with the terminal apparatus 22.

The controller 55 generates print data on the basis of print jobs received from the first communication unit 51 and the second communication unit 52, and controls so that the generated print data is printed from the print unit 57. The data storage unit 54 stores various data such as the print data generated by the controller 55.

The display 56 controlled by the controller 55 displays various types of information to a user. The operation input unit 53 receives information about various operations performed by a user.

The print unit 57 prints an image on a recording medium such as a print sheet on the basis of control exerted by the controller 55.

When a user is to obtain information from the server apparatuses 41 to 43 in external public institutions via the network 31 and the WAN 50 by operating the terminal apparatus 21 and perform a task by using the terminal apparatus 22, the user transfers the obtained information to the terminal apparatus 22 via the image forming apparatus 10.

At that time, the operation input unit 53 receives a selection of information types that are to be transferred to the terminal apparatus 22 over the network 32. The selection is selected from multiple types of information included in the data obtained over the network 31.

The controller 55 refers to the selection information received by the operation input unit 53. When the selected types of information constitute a predetermined particular combination, the controller 55 exerts control so that the selected pieces of information are not transferred to the terminal apparatus 22.

For example, when multiple types, that is, two different types of information, are selected at the same time, the controller 55 exerts control so that the two selected pieces of information are not transferred to the terminal apparatus 22.

When personally identifiable information with which a person may be identified and personally descriptive information about the person are selected, the controller 55 may exert control so that the selected pieces of information are not transferred to the terminal apparatus 22.

The personally identifiable information is information including, for example, individual number information such as a social security and tax number. The personally descriptive information is private, confidential information about a person.

When the selected types of information constitute a predetermined particular combination, the controller 55 may exert control so that a user is notified, for example, through the display 56, of a message that the selected pieces of information are not capable of being transferred to the terminal apparatus 22.

When the selected types of information do not constitute a predetermined particular combination, the controller 55 exerts control so that the selected pieces of information are transferred to the terminal apparatus 22.

The data storage unit 54 may store a history of information that was transmitted over the network 32 in the past.

When information to be transferred to the terminal apparatus 22 is selected, the controller 55 refers to the history information stored in the data storage unit 54. When the type of selected information and the type of information that has been transmitted within a predetermined period constitute a predetermined particular combination, the controller 55 may exert control so that the selected information is not transferred to the terminal apparatus 22.

In this case, the controller 55 may exert control as follows. The information for which control has been exerted so that the information is not transferred to the terminal apparatus 22 is accumulated as a reserved job, and the accumulated information is transferred to the terminal apparatus 22 after elapse of a predetermined time.

Even in the case where the selected types of information constitute a predetermined particular combination, when the output destinations of the selected pieces of information are different from each other, the controller 55 may exert control so that the selected pieces of information are transferred to the specified output destinations.

Thus, the image forming apparatus 10 according to the exemplary embodiment includes the first and second communication units 51 and 52 which may be connected to the at least two different networks 31 and 32. When the selected types of information constitute a predetermined particular combination, the controller 55 exerts control so that the selected pieces of information are not transmitted to another network that is different from the network over which the information is obtained.

Specifically, in the case where multiple types of private information are obtained over the network 31, when multiple types of information are selected from the obtained pieces of private information and an instruction to transmit the selected information is provided, the controller 55 exerts control so that the selected pieces of information are not transmitted to the network 32.

Instead of control in which, when multiple types of information are selected, the selected types of information are not to be transferred, the controller 55 may control the operation input unit 53 so that, when a certain piece of information is selected, information of a type with which the type of the selected information constitutes a predetermined particular combination is not capable of being selected. That is, the controller 55 causes multiple types of information that are not to be transferred at the same time, not to be selected at the same time. Thus, the controller 55 exerts control so that the multiple types of information are not transferred to the terminal apparatus 22 at the same time.

For example, the controller 55 controls the operation input unit 53 so that multiple types of information, that is, two pieces of information, are not selected at the same time.

Operation of the information processing system according to the exemplary embodiment will be described in detail by referring to drawings.

Figure 4:
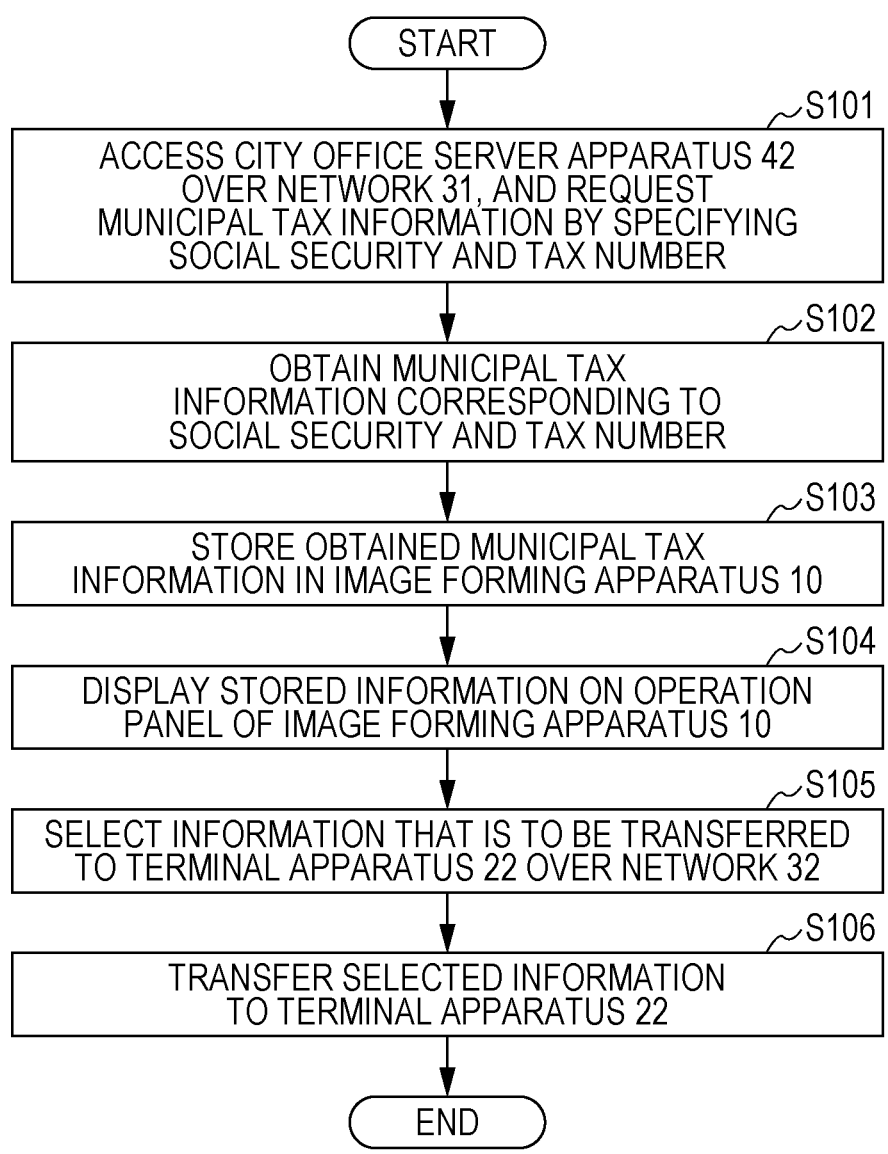
FIG. 4 is a flowchart for describing an overall process of the information processing system according to the exemplary embodiment of the present invention.

The entire operation of the information processing system according to the exemplary embodiment will be described by referring to the flowchart in FIG. 4.

A description will be made below about a process performed in the case where a user in the pension service obtains municipal tax information of a certain person from the server apparatus 42 in the city office, and transfers the obtained municipal tax information to the terminal apparatus 22 via the image forming apparatus 10.

A user accesses the server apparatus 42 in the city office over the network 31 and the WAN 50 by operating the terminal apparatus 21, and requests municipal tax information by specifying the social security and tax number of a person whose municipal tax information is to be obtained (step S101). As a result, the terminal apparatus 21 obtains municipal tax information corresponding to the specified social security and tax number from the server apparatus 42 (step S102).

FIG. 5 illustrates exemplary municipal tax information thus obtained from the server apparatus 42 in the city office. The exemplary municipal tax information illustrated in FIG. 5 includes the person name, the social security and tax number, and information about municipal tax records.

To transfer the obtained municipal tax information to the terminal apparatus 22, the municipal tax information obtained by operating the terminal apparatus 21 is stored in the image forming apparatus 10 (step S103). As illustrated in FIG. 5, for example, private information obtained from various public institutions are often generated on the basis of given formats. Therefore, the image forming apparatus 10 specifies the type of stored private information by using the format information, and stores the private information for each specified type.

The user operates the image forming apparatus 10 to display the stored information on an operation panel (step S104), and selects, from the pieces of displayed information, information that is to be transferred to the terminal apparatus 22 over the network 32 (step S105). The image forming apparatus 10 transfers the selected information to the terminal apparatus 22 over the network 32 (step S106).

Then, the following operations described by using the flowchart in FIG. 4 will be described in detail by referring to the flowchart in FIG. 6. In the operations, stored information is displayed on the operation panel of the image forming apparatus 10; information to be transmitted (transferred) to the terminal apparatus 22 is selected from the pieces of displayed information; and the selected information is transmitted.

A description will be made below under the assumption that municipal tax information and medical payment information of a certain person are stored in the image forming apparatus 10.

A user uses the image forming apparatus 10 to specify a certain person and give an instruction to display stored information of the specified person, from the operation panel (step S201). Then, the image forming apparatus 10 displays, on the operation panel, a list of pieces of information stored in association with the specified person (step S202).

Figure 7:
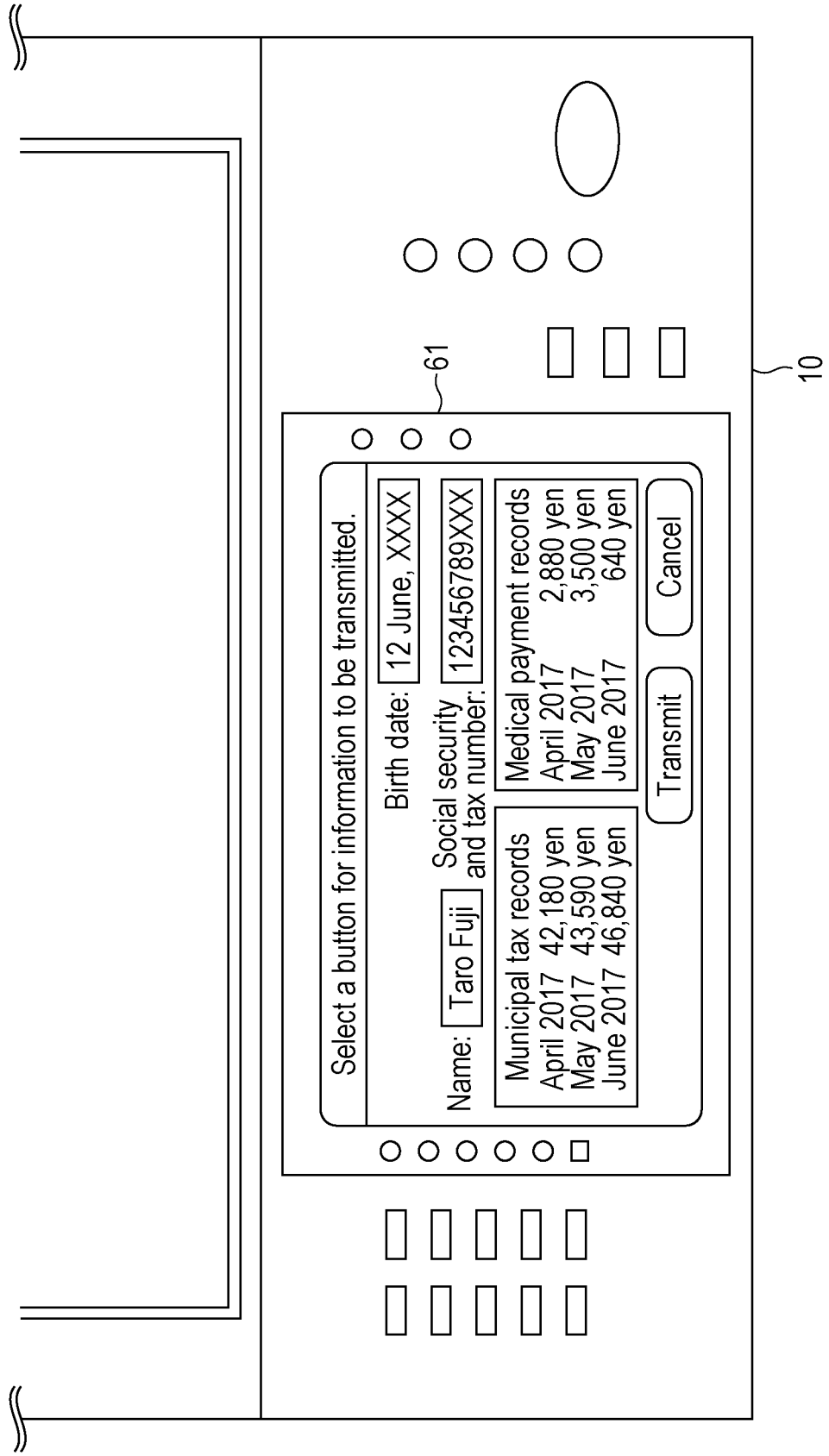
FIG. 7 is a diagram illustrating a state in which private information is displayed on an operation panel of the image forming apparatus.

FIG. 7 illustrates exemplary information thus displayed on the operation panel. FIG. 7 illustrates the state in which the name, the birth date, the municipal tax information, and the medical payment information of a person whose social security and tax number is "123456789XXX" are displayed on an operation panel 61 of the image forming apparatus 10. FIG. 8 is an enlarged view of the display screen of the operation panel 61 illustrated in FIG. 7.

The image forming apparatus 10 receives a selection of information that is to be transmitted to the terminal apparatus 22. The selection is selected from the multiple types of information thus displayed (step S203). Specifically, in the exemplary display screen in FIG. 8, five types of private information, the name, the birth date, the social security and tax number, the municipal tax information, and the medical payment information, are displayed on the operation panel 61. Therefore, the image forming apparatus 10 receives a selection of private information that is to be transmitted to the terminal apparatus 22 over the network 32. The selection is selected from the five types of displayed private information.

In this example, a case in which, when multiple types of private information are selected, the controller 55 exerts control so that the selected types of private information are not transmitted to the terminal apparatus 22 at the same time will be described.

If multiple types of private information are selected on the operation panel (yes in step S204), the controller 55 does not transmit the selected types of private information to the terminal apparatus 22, and displays a warning screen (step S205).

If multiple types of private information are not selected on the operation panel (no in step S204), that is, if only one type of private information is selected, the controller 55 transmits the selected private information to the terminal apparatus 22 over the network 32 (step S206).

Concrete examples of the operations illustrated in the flowchart in FIG. 6 will be described by referring to FIGS. 9 to 12.

Figure 9:
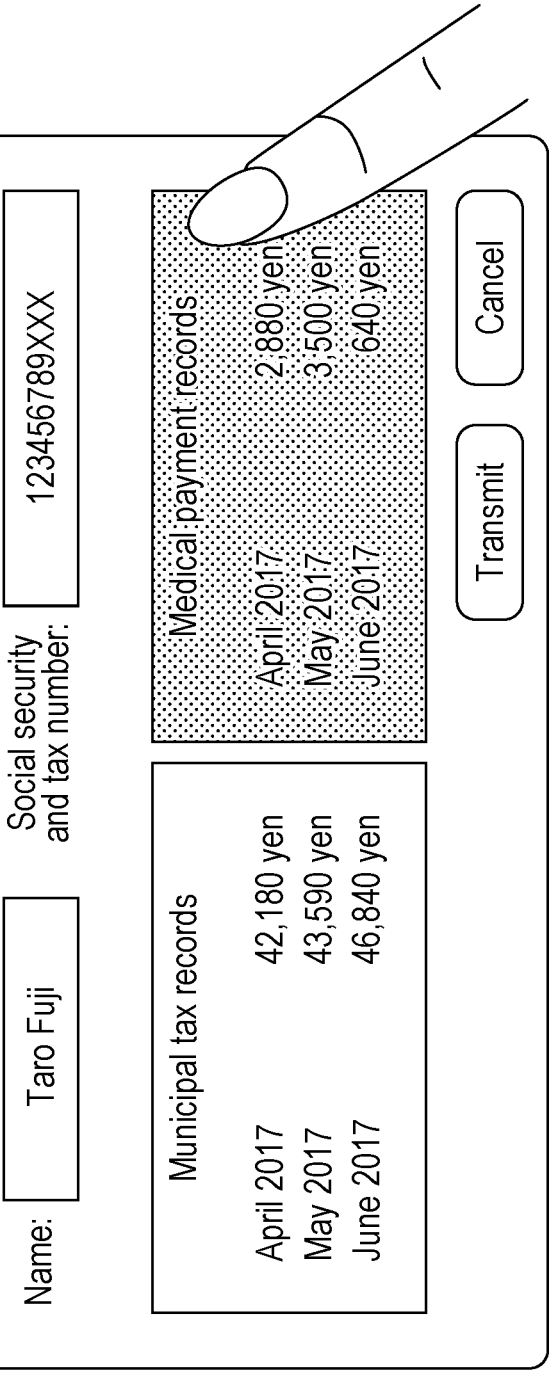
FIG. 9 is a diagram illustrating the state in which medical payment information is selected from multiple types of private information displayed on the operation panel.

FIG. 9 illustrates the state in which the medical payment information is selected from the types of private information displayed on the operation panel. FIG. 9 illustrates the state in which a touch of the medical payment information with a user's finger has caused the medical payment information to be selected. In the state illustrated in FIG. 9, when the user touches the transmission button to give a transmission instruction, only one type of private information, the medical payment information, is selected. Therefore, the controller 55 controls the second communication unit 52 so that the selected medical payment information is transmitted to the terminal apparatus 22 over the network 32.

Figure 10:
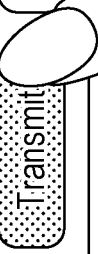
FIG. 10 is a diagram illustrating an exemplary screen of the operation panel displayed when two types of information are selected.

FIG. 10 illustrates an exemplary screen of the operation panel displayed when two types of information are selected. FIG. 10 illustrates a case in which two types of information, the social security and tax number and the medical payment information, are selected. When, in the state illustrated in FIG. 10, a user touches the transmission button so as to give a transmission instruction, the controller 55 controls the display 56 so that a warning screen illustrated in FIG. 11 is displayed on the operation panel.

Figure 11:
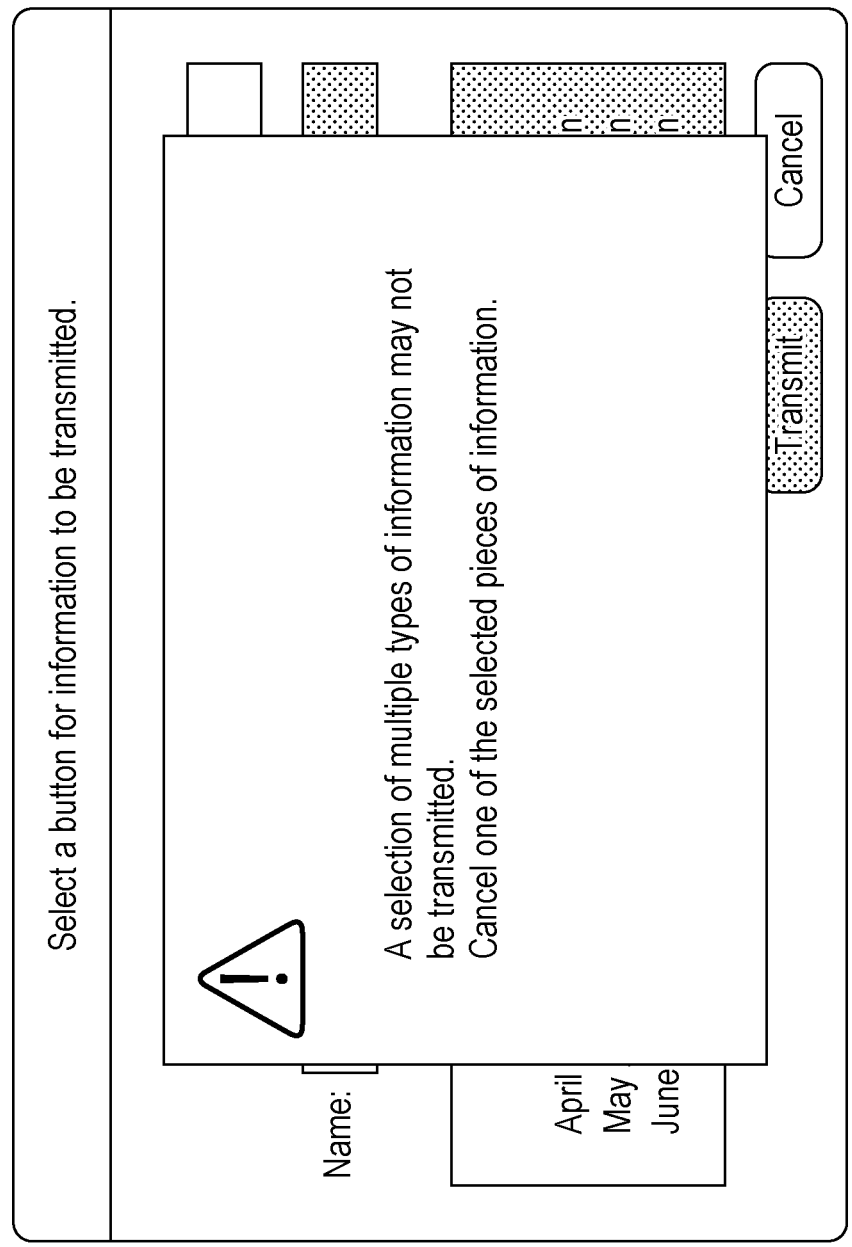
FIG. 11 is a diagram illustrating an exemplary warning screen displayed on the operation panel when a transmission instruction is given with two types of information being selected.

On the exemplary warning screen illustrated in FIG. 11, a message, "A selection of multiple types of information may not be transmitted. Cancel one of the selected pieces of information.", is displayed. A user is notified that a selection of multiple types of information may not be transmitted.

Figure 12:
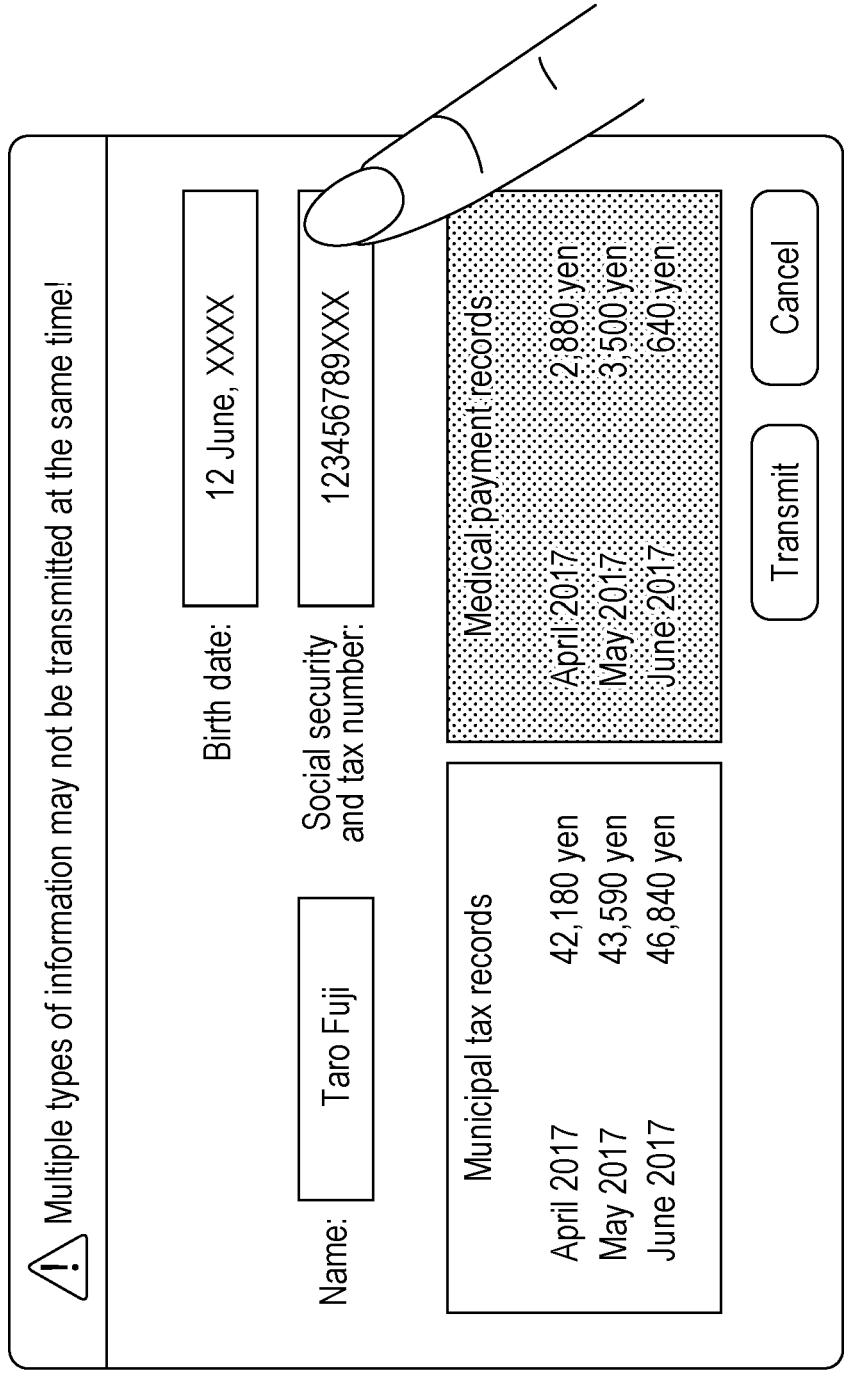
FIG. 12 is a diagram illustrating an exemplary screen displayed when multiple types of information are not to be selected.

FIG. 12 illustrates an exemplary screen displayed when multiple types of information are not to be selected. FIG. 12 illustrates a case in which, with certain private information being selected, another different type of information is selected. Specifically, FIG. 12 illustrates an exemplary screen displayed when the social security and tax number is to be selected in the state in which the medical payment information has been already selected. In this case, as illustrated in FIG. 12, a message, "Multiple types of information may not be transmitted at the same time!", is displayed in an upper portion of the operation panel. A user is notified that multiple types of private information may not be selected.

The case in which two or more types of private information are not to be transmitted to the terminal apparatus 22 at the same time is described above as the simplest example. Alternatively, combinations of pieces of information which are inhibited from being transmitted may be set in advance. When selected types of information correspond to one of the combinations, the selected pieces of information may not be transmitted.

FIG. 13 illustrates exemplary combinations of pieces of information which are inhibited from being transmitted. In FIG. 13, it is found that the following setting is made. For example, in the case where the social security and tax number and the name information are selected at the same time, or where the social security and tax number and the address information are selected at the same time, even when an instruction to transmit the selected types of information is given, the transmission instruction is not carried out.

By setting these combinations, control may be exerted so that, for example, when personally identifiable information of a person and personally descriptive information of the person are selected, the transmission is inhibited, or, when multiple types of information with which a person is not capable of being identified are selected, the transmission is not inhibited.

The above-described processes achieve control in which multiple types of information constituting a particular combination are not transmitted at the same time. However, the case in which multiple types of information constituting such a combination are transmitted to the same transmission destination in a short time interval may produce the same result as the case in which multiple types of private information are leaked as a group.

Processes of the image forming apparatus 10 for preventing occurrence of such a case will be described by referring to the flowchart in FIG. 14.

Figure 6:
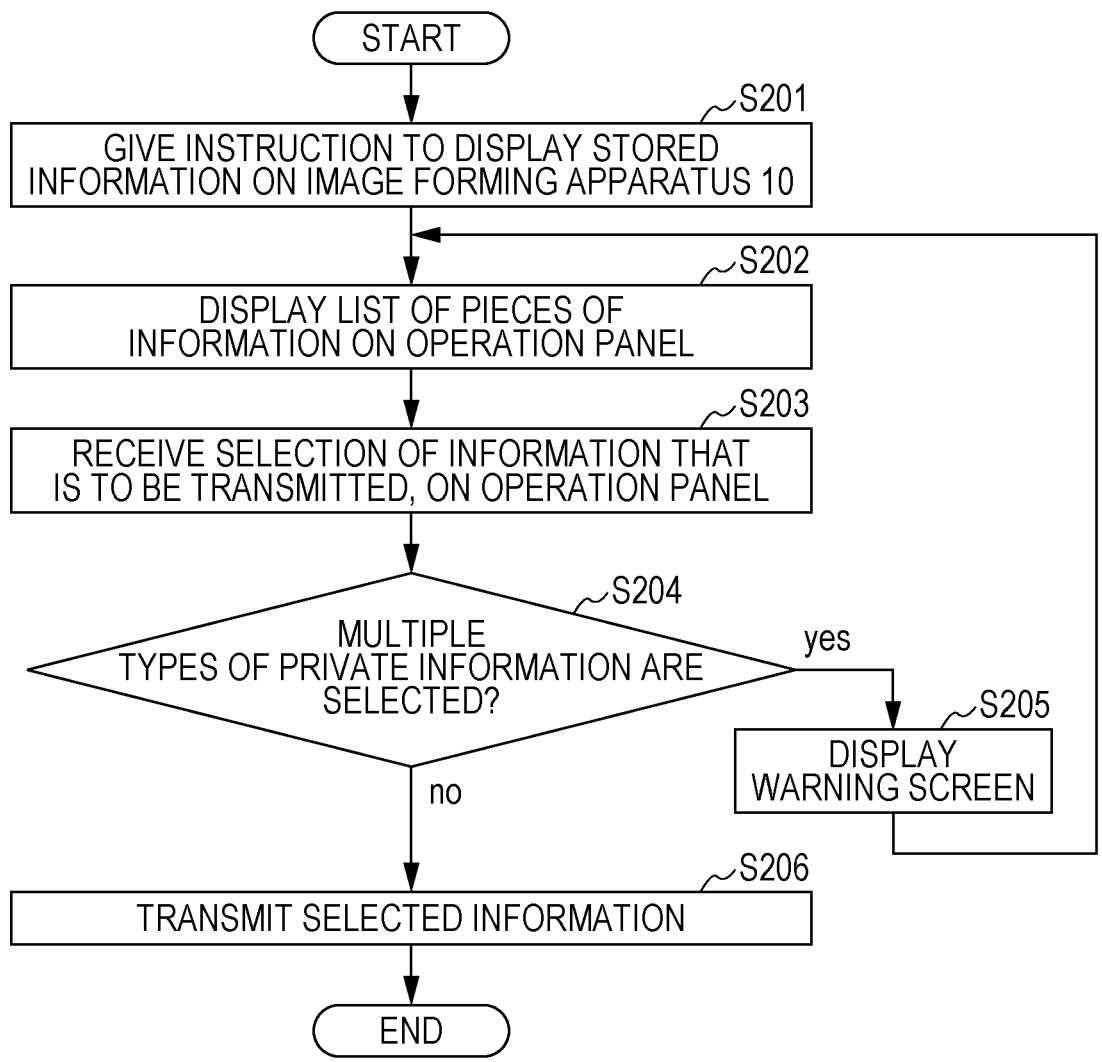
FIG. 6 is a flowchart for describing a detailed process in which information to be transmitted to a terminal apparatus is selected, for transmission, from pieces of information displayed on an operation panel.
Figure 14:
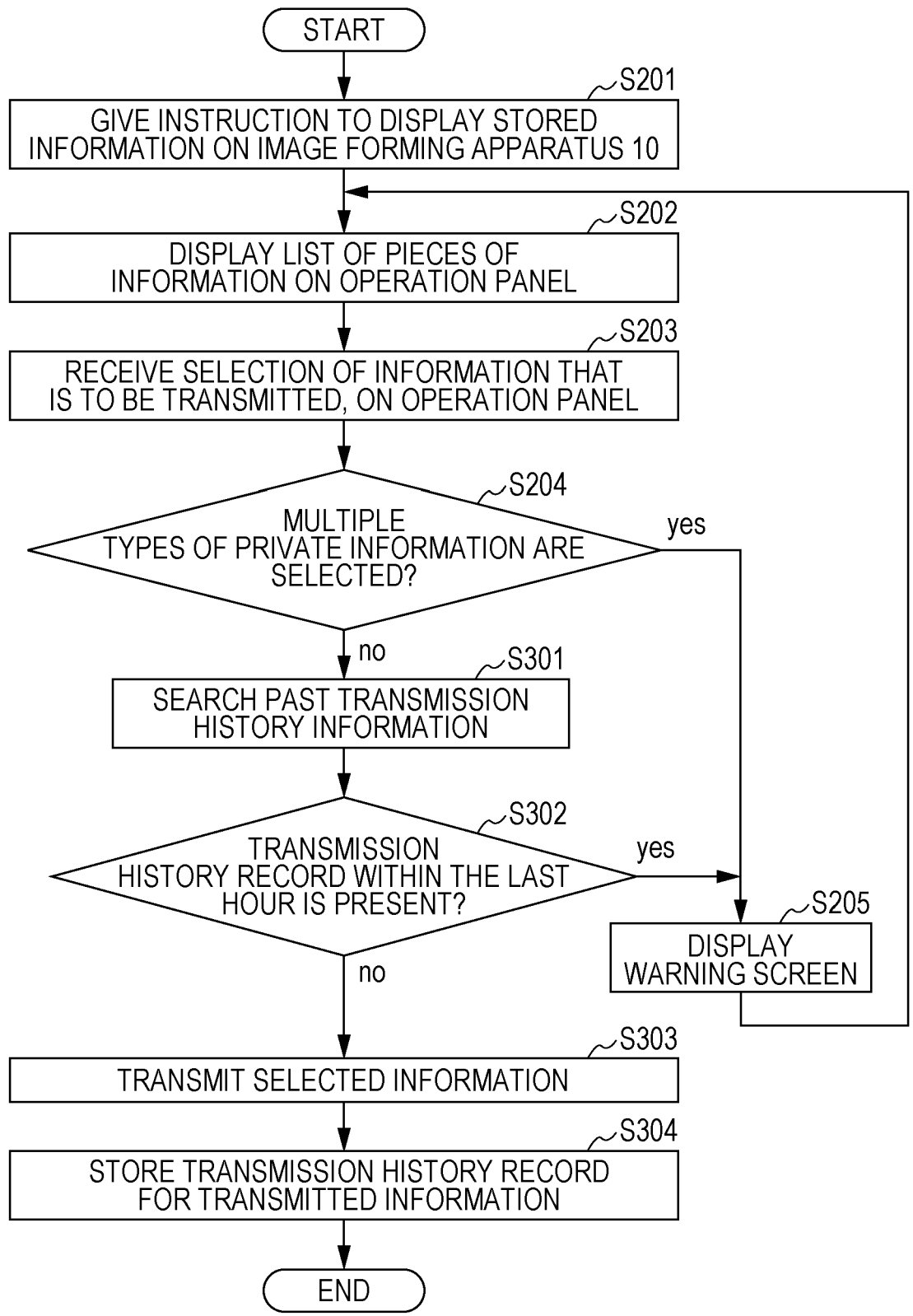
FIG. 14 is a flowchart for describing processes for avoiding occurrence of a case in which multiple types of private information constituting a particular combination are transmitted at a short time interval.

In the flowchart in FIG. 14, the processes in steps S201 to S205 are the same as those in the flowchart in FIG. 6, and will not be described.

To implement such processes, the image forming apparatus 10 stores a history of private information that was transmitted over the network 32 in the past, in the data storage unit 54 as transmission history information. FIG. 15 illustrates exemplary transmission history information.

In the exemplary transmission history information illustrated in FIG. 15, an example in which the transmission time, the transmission destination, the transmitted information, and the individual number are stored for each transmission process that was performed is illustrated. The individual number is a number with which a person may be identified, and, for example, the social security and tax number may be used.

In the flowchart in FIG. 14, if multiple types of private information are not selected on the operation panel (no in step S204), that is, if only one type of private information is selected, the controller 55 searches the transmission history information illustrated in FIG. 15 for a past transmission history record related to the private information, transmission of which is commanded (step S301).

If a transmission history record of the same person which indicates transmission performed in a given period starting from the current time, for example, within one hour, is present (yes in step S302), the controller 55 displays a warning screen saying that the specified transmission instruction may not be performed, on the operation panel (step S205).

If no transmission history records of the same person which indicate transmission performed within one hour from the current time are present (no in step S302), the controller 55 transmits the selected private information to the terminal apparatus 22 over the network 32 (step S303). The controller 55 adds, for storage, a transmission history record about the transmitted information to the transmission history information (step S304).

These processes cause the process of transmitting private information within a preset period, to be handled similarly to the case of simultaneous transmission. The controller 55 may accumulate, as a reserved job, information having been controlled so that the information is not transferred to the terminal apparatus 22, and may transfer the information to the terminal apparatus 22 after elapse of a predetermined time.

In the exemplary embodiment, the case in which, when selected types of information constitute a predetermined particular combination, the controller 55 exerts control so that the selected pieces of information are not transferred (transmitted) to the terminal apparatus 22 is described. However, the present invention is not limited to this case. The present invention may be similarly applied also to a case in which information such as private information obtained over the network 31 is stored in the image forming apparatus 10, and in which the stored information is then printed. In this case, for example, when selected types of information constitute a predetermined particular combination, the controller 55 may control the print unit 57 so that the selected pieces of information are not printed on a recording medium. That is, when selected types of information constitute a predetermined particular combination, the controller 55 exerts control so that the selected pieces of information are not subjected to an output process such as transfer or printing.

In the exemplary embodiment, the case in which the image forming apparatus 10 is connected to two different networks, the networks 31 and 32, is described. The present invention may be similarly applied also to the case where the image forming apparatus 10 is connected to three or more different networks.

MODIFIED EXAMPLES

In the above-described exemplary embodiment, the description is made by using the case in which the present invention is applied to an image forming apparatus such as a multifunction device. The present invention is not limited to this. The present invention may be similarly applied also to the case of an information processing apparatus such as a personal computer as long as the information processing apparatus may be connected to multiple networks.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
receive a selection of information which is to be output, the selection being selected from a plurality of types of information included in data obtained over a network and being based on each type;
determine whether the selected information includes a predetermined particular combination of private information;
when the selected information includes the predetermined particular combination of private information, exert control to prevent a plurality of selected pieces of information from being output; and
when the selected information does not include the predetermined particular combination of private information, exert control to output the plurality of selected pieces of information.

2. The information processing apparatus according to claim 1,
wherein, when the selected information includes a plurality of types of information, the controller exerts control in such a manner that the plurality of selected pieces of information are not output.

3. The information processing apparatus according to claim 2,
wherein, when the plurality of selected types of information constitute the predetermined particular combination, the controller exerts control in such a manner that a message that the plurality of selected pieces of information are not capable of being output is provided.

4. The information processing apparatus according to claim 1,
wherein, when personally identifiable information and personally descriptive information are selected, the controller exerts control in such a manner that the plurality of selected pieces of information are not output, the personally identifiable information being information with which a person is capable of being identified, the personally descriptive information being information about the person.

5. The information processing apparatus according to claim 4,
wherein the personally identifiable information includes an individual number, and the personally descriptive information is private, confidential information about the person.

6. The information processing apparatus according to claim 5,
wherein, when the plurality of selected types of information constitute the predetermined particular combination, the controller exerts control in such a manner that a message that the plurality of selected pieces of information are not capable of being output is provided.

7. The information processing apparatus according to claim 4,
wherein, when the plurality of selected types of information constitute the predetermined particular combination, the controller exerts control in such a manner that a message that the plurality of selected pieces of information are not capable of being output is provided.

8. The information processing apparatus according to claim 1,
wherein, when the plurality of selected types of information constitute the predetermined particular combination, the controller exerts control in such a manner that a message that the plurality of selected pieces of information are not capable of being output is provided.

9. The information processing apparatus according to claim 1,
wherein, when the plurality of selected types of information do not constitute the predetermined particular combination, the controller exerts control in such a manner that the plurality of selected pieces of information are output.

10. The information processing apparatus according to claim 1, further comprising:
a memory that stores a history about information which was output in the past, wherein, when a type of selected information and a type of information that has been output within a predetermined period constitute the predetermined particular combination, the controller exerts control in such a manner that the selected information is not output.

11. The information processing apparatus according to claim 10,
wherein the controller exerts control in such a manner that the selected information is output after elapse of a predetermined time, the selected information having been controlled so as not to be output.

12. The information processing apparatus according to claim 1,
wherein, even when the plurality of selected types of information constitute the predetermined particular combination, if output destinations of the plurality of selected pieces of information are different from each other, the controller exerts control in such a manner that the plurality of selected pieces of information are output.

13. The information processing apparatus according to claim 1, further comprising:
a communication unit that is capable of being connected to at least two different networks,
wherein, when the plurality of selected types of information constitute the predetermined particular combination, the controller exerts control in such a manner that the plurality of selected pieces of information are not transmitted to a second network that is different from a first network from which the plurality of selected pieces of information are obtained.

14. An information processing apparatus comprising:
a processor programmed to:
receive a selection of information which is to be output, the selection being selected from a plurality of types of information included in data obtained over a network and being based on each type;
determine whether the selected information includes certain private information of a predetermined particular combination of private information constituting multiple types of private information;
when the selected information includes the multiple types of private information, exert control to prevent simultaneous selection of the multiple types of private information; and
when the selected information does not include the multiple type of private information, exert control to output the selected information.

15. An image forming apparatus comprising:
a print unit that prints an image on a recording medium; and
a processor programmed to:
receive a selection of information which is to be output, the selection being selected from a plurality of types of information included in data obtained over a network and being based on each type;
determine whether the selected information includes a predetermined particular combination of private information;
when the selected information includes the predetermined particular combination of private information, exert control to prevent a plurality of selected pieces of information from being printed on the recording medium; and
when the selected information does not include the predetermined particular combination of private information, exert control to print the plurality of selected pieces of information on the recording medium.

16. A non-transitory computer readable medium storing a program causing a computer to execute a process comprising:
receiving a selection of information which is to be output, the selection being selected from a plurality of types of information included in data obtained over a network and being based on each type;
determining whether the selected information includes a predetermined particular combination of private information;
when the selected information includes the predetermined particular combination of private information, exerting control to prevent a plurality of selected pieces of information from being output; and
when the selected information does not include the predetermined particular combination of private information, exerting control to output the plurality of selected pieces of information.

* * * * *